US006831556B1

(12) United States Patent  (10) Patent No.: US 6,831,556 B1
Boykin  (45) Date of Patent: Dec. 14, 2004

(54) COMPOSITE MOBILE DIGITAL INFORMATION SYSTEM

(75) Inventor: Paul R. Boykin, Mt. Juliet, TN (US)

(73) Assignee: Digital Safety Technologies, Inc., Nashville, TN (US)

( * ) Notice: Subject to any disclaimer, the term of this patent is extended or adjusted under 35 U.S.C. 154(b) by 8 days.

(21) Appl. No.: 09/855,653

(22) Filed: May 16, 2001

(51) Int. Cl.[7] .............................................. G08B 1/08
(52) U.S. Cl. .................... 340/539.1; 340/937; 348/143; 348/148; 701/35
(58) Field of Search ........................... 340/539.1, 426.1, 340/426.13, 426.16, 426.19, 426.2, 426.25, 937; 348/143, 148; 701/35, 36

(56) References Cited

U.S. PATENT DOCUMENTS 5,677,979 A * 10/1997 Squicciarini et al. ......... 386/46
5,815,093 A * 9/1998 Kikinis ....................... 340/937
6,002,326 A * 12/1999 Turner ........................ 340/426
6,298,290 B1 * 10/2001 Abe et al. ..................... 701/35
6,389,340 B1 * 5/2002 Rayner ......................... 701/35
6,411,874 B2 * 6/2002 Morgan et al. ............... 701/36
6,421,080 B1 * 7/2002 Lambert ...................... 348/143
6,518,881 B2 * 2/2003 Monroe ....................... 340/539

* cited by examiner

Primary Examiner—Daryl Pope
(74) Attorney, Agent, or Firm—Sughrue Mion, PLLC

(57) ABSTRACT

A surveillance system includes a device for capturing video, audio, and data information. The device is provided in a first location, such as a vehicle. A server is provided for integrating and storing the captured information in the vehicle. The server may be a mobile server which is capable of transmitting the captured information from the vehicle to a second location, such as a building.

25 Claims, 2 Drawing Sheets

COMPOSITE MOBILE DIGITAL INFORMATION SYSTEM

TECHNICAL FIELD

The present invention is directed to a composite mobile digital information recording system. In particular, the present invention is directed to a system for use in public and commercial vehicles to capture video, audio, and related information for surveillance and evidentiary purposes.

BACKGROUND

Typical video recording systems, such as those currently deployed in police vehicles, use a standard fixed camera and a videocassette recorder (VCR) recording on a standard videotape, such as a video home system (VHS) tape. The VCR is usually located in the trunk of the vehicle. Recording quality is limited, primarily by the recording speed of the videotape. At standard speed the tape must be changed every two hours. At the slowest speed, a maximum of six hours is possible. Recording at the slowest speed, however, significantly reduces the quality of the recorded material.

Besides quality and capacity issues, VCR problems also include machine failure and tape failure, which require physical replacement and repair, and often occur without the knowledge of the user. Also, with respect to the videotapes, the user must physically remove and replace the videotapes in the VCR, and it is cumbersome to store the videotapes.

The VCR is a technical device nearing the end of its lifecycle; therefore, no serious advancements are on the drawing board that address the numerous technical issues incumbent to videotape recording. On the other hand, digital capture and storage is at the beginning of its technological curve, with rapid development of new devices. The only available means to ensure sufficient quality and control of video recording, access, and storage is an increase in the number of well-trained persons with those responsibilities. On the other hand, advancements of digital technologies are reducing the need for human involvement and even training.

The present invention is an elegant solution to the problems inherent in the current videotape systems deployed by public agencies and private companies for surveillance and evidentiary purposes.

SUMMARY OF THE INVENTION

The present invention provides an effective and efficient method for capturing, transmitting, and storing potential evidentiary video and related information in mobile environments. The captured data is stored in onboard hard drives, or other storage facilities, such as flash memory, solid state memory, etc., and transferred to a home base data repository for archival, retrieval, and evidentiary use.

The present invention provides a surveillance system which includes a device for capturing video, audio, and data information. The device is provided in a first location, such as a vehicle. A mobile server is provided for integrating and storing the captured information in the vehicle. The mobile server is capable of transmitting the captured information from the vehicle to a second location, such as a building.

In addition, the present invention involves a method for managing video, audio, and data information which includes capturing the information, integrating the information into one data stream, and storing the data stream.

The invention also involves a computer system, interface, and computer program product for implementing the foregoing method.

BRIEF DESCRIPTION OF THE DRAWINGS

The above objects and advantages of the present invention will become more apparent by describing in detail preferred embodiments thereof with reference to the attached drawings, in which.

DETAILED DESCRIPTION

The present invention simultaneously captures and stores visual, audible, time, data, and motion-related activities for safety, emergency, and evidentiary purposes. The present invention can be deployed on police, fire, and rescue vehicles and is adaptable for use on transportation and industry vehicles, as well as having rail and airline applications. The present invention is not limited to these applications, and may be used in any environment in which a surveillance system is desired, either mobile or non-mobile.

The system generally operates through the integration of the following components: video capture; audio capture; related-data capture; an information integrator; a computer processing unit (CPU); a storage unit; and a transmission unit. The user has the option of video-only capture, audio-only capture, data-only capture, or any combination of the three information processors.

With the present invention according to the preferred embodiment, there is no limitation due to the tape speed or quality because digital video and related information are recorded on the hard drive of an onboard computer. The capacity of the present invention to capture, store, and transmit streams of video/audio/event information data significantly expands the value and the capacity of an onboard videotape surveillance system.

The embodiment disclosed herein is used in a police car wherein the information is captured, stored and can be transmitted back to a home base (e.g., a station precinct); however, the present invention is not limited to this example and may be used in any type of environment in which a surveillance system is desired.

Figure 1:
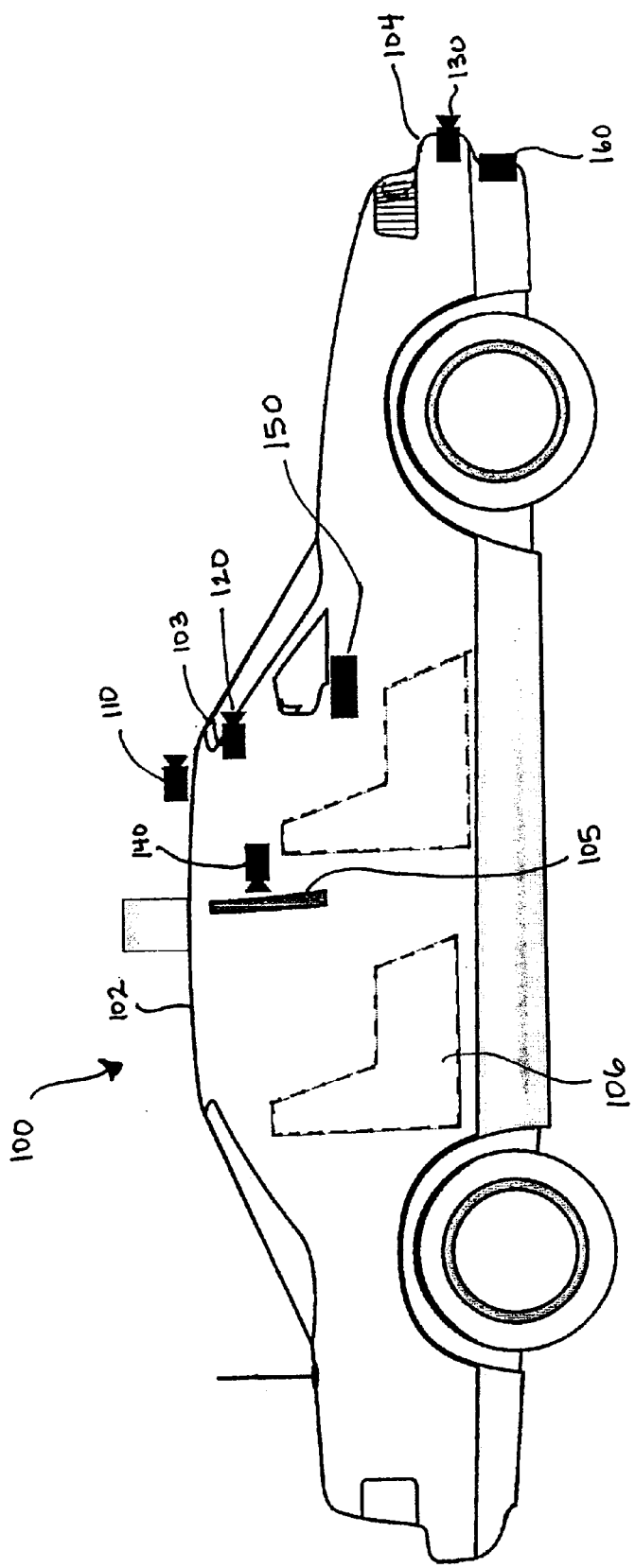
FIG. 1 illustrates the present invention in a police car example.

FIG. 1 illustrates the present invention embodied in a police car 100. In particular, a composite mobile digital information system (CMDIS) unit 150 is provided in the police car 100 for storing and transmitting captured information. In this example, up to four video cameras are strategically mounted in four locations on the police car 100 for use with the CMDIS 150: a first camera 110 is mounted on a roof 102 facing forward; a second camera 120 is mounted on a rearview mirror 103 facing forward; a third camera 130 is mounted on a bumper (grill) 104 facing forward; and a fourth camera 140 is mounted on a front cage 105 facing towards a back seat 106. Of course, varying numbers of cameras may be used in these or other desired locations.

The cameras 110–140 may be, for example, high-resolution National Television System Committee (NTSC) analog cameras, digital cameras, or component analog cameras. A multiplexer can be added to the cameras 110–140 to increase the number of views seen at one time.

The cameras located on the police car 100 can be remote controlled by a local user (e.g., officer), a remote user (e.g., precinct personnel), or can be operated to track the officer or specified object. Camera controls permit pan, tilt, record, search, playback, focus and contrast adjustments, as well as other features which may be necessary for obtaining a high quality surveillance system. Moreover, one or more of the cameras 110–140 can also be enabled to automatically track the officer, without requiring any human input, if appropriate software is installed in a mobile server 200 (described later).

During recording and playback of the recorded data, digital coding provides tags for future search parameters. For instance, searchable identification code may be embedded in the data which is associated with a particular event. Thus, the data can be easily retrieved for evidentiary purposes at a later time without necessitating labor intensive searches of the recorded material.

With the present invention, data is digitally captured and processed from any one or all of the cameras for integration and storage in the mobile server 200 (see FIG. 2) of the CMDIS unit 150. In addition, live views of video/audio/data information may be transmitted from the vehicle 100 to a home base 210 through high speed local links, e.g., cellular devices, as discussed in further detail later. In addition, video/audio/data information can be broadcast or transferred from the home base 210 to the vehicle 100, or to multiple vehicles in various locations.

With respect to the capture of video information, the resolution of the video capture (or signal) is compressed or decompressed (encoded/decoded (CODEC) for transmission and then decoded once it reaches its destination) to provide the appropriate resolution for storage. Typical resolutions are 720×480, 320×240, or 160×120 pixels. Pixels are the smallest element of a video image. The lower the pixels selected, the lower the quality of the resolution and the higher the capacity for storing images.

In the present embodiment, a video capture processor and digitizer 220 captures, digitizes, and transmits the captured video to a video/audio/data information multiplexer/CODEC 250 of the mobile server 200. The video/audio/data information multiplexer/CODEC 250 may include a digital signal processor (DSP) (e.g., the Texas Instruments TMS320C6415), or other similar device.

In addition to the video capture described above, an audio capture processor and digitizer 230 captures, digitizes, and transmits captured audio to the video/audio/data information multiplexer/CODEC 250. In the example shown in FIG. 2, there is provision for the input of two audio sources 232, 234 to be digitally captured and processed. For example, a police officer can wear a wireless microphone 234 and one microphone 232 may be configured to capture sound from the rear seat of the vehicle 100. After the audio is captured, the audio is transmitted to the video/audio/data information multiplexer/CODEC 250 and the appropriate CODEC (compression) is applied. Of course, the present invention is not limited to having two audio sources; an appropriate number of audio sources may be provided in a variety of locations depending on the application requirements.

A data capture processor and digitizer 240 captures various types of data which are also transmitted to the video/audio/data information multiplexer/CODEC 250. In the present example, capture and processing of sixteen inputs 241 (e.g., time, various event information, and motion related events) are provided. For instance, the surveillance system of the present invention can capture and store the action of removal of a weapon from its rack, a car door opening or closing, the status of the ignition, air bag deployment, presence of an unauthorized individual, and vehicle speed. The various inputs can be configured according to a user need and the particular event.

In addition to the sixteen related-events inputs 241, other automatically recorded data may include location, using a Global Positioning Satellite (GPS) receiver 242, time of day, driver name, unit number, and incident number and other types of relevant information.

Various ports are provided for allowing input and output of data. For example, two serial ports 246, 247 and two universal serial bus (USB) ports 248, 249 may be provided for additional data input and output. For example, the USB ports 248, 249 can be used to input information from a magnetic or optical reader 244 and a fingerprint reader 245. One serial port 246 can be used to input and output data to and from a laptop 243, and the other serial port 247 can be connected to receiving/transmitting device 283 (one of a variety of wireless modem, cellular, satellite, and microwave devices) that sends radio signals back to the home base or precinct 210. Of course, the present invention is not limited to this configuration since a variety of ports can be provided depending on the types of data being captured and the parameters required for the specific application in which the present invention is employed. The transmitting/receiving device 283 may comprise any device capable of transmitting at least some of the audio, video, and data information collected by the server 200. The transmitting receiving device 283 which is employed for a particular surveillance system will depend upon the user's preferences and environmental limitations.

The captured data from the sixteen inputs, GPS 242, and ports are digitized and relayed to the video/audio/data information multiplexer/CODEC 250 and combined with the video and audio information from the video capture processor and digitizer 220 and the audio capture processor and digitizer 230 to create aggregated documentation that is sent to a storage unit 270 in one data stream. In particular, the stream of data is multiplexed into one final composite compressed stream. Thus, all of the various types of information are aggregated into a single data stream which is then stored in the storage unit 270. Although in this embodiment the compression is shown in the multiplexer/CODEC 250, this function can be carried out by software in an alternative embodiment, for example with CPU 260.

The CPU server 260 runs embedded operating systems, such as Windows NT or a real-time operating system, and functions as a server for all sources of information. The CPU 260 can control the multiplexer/CODEC 250, the storage unit 270, and other aspects of the CMDIS 150. In an alternative arrangement, the CPU 260 can perform the multiplexing function itself, thereby eliminating the need for a separate multiplexer.

The CPU 260 has remote access features that allow technicians to perform system maintenance and repairs at any time, day or night. If a user experiences a malfunction, technicians can examine and resolve it, or ship a repair part quickly. The remote service connection also provides field updating of new software features for the CMDIS 150.

The CPU 260 may include a remote, local, and/or automatic tracking camera control 264, for controlling the various functions of the cameras 110–140, as discussed earlier.

The CPU 260 also commands the multiplexer/CODEC 250 to embed the searchable identification code (tags) which is associated with a particular event or information, into the data stream. The CPU 260 detects the particular events or information, and commands the multiplexer/CODEC 250 to include the tags.

In addition, a flash memory 272 may be provided for storing instructions for execution by the CPU 260.

The storage unit 270 contains a random access memory (RAM) memory buffer 276, and two hard disk storage drives 278 that are driven by the CPU 260. The combined video/audio/data information stream is first sent to the RAM memory buffer 276 that holds two or more minutes of real-time information. The RAM memory buffer 276 refreshes every time a new record command tells the CPU 260 to transmit the first minutes of the buffered memory onto the hard drives 278. One purpose of the RAM memory buffer 276 is to provide the operator with a view of the events that initiated the recording process. For instance, when information is being retrieved at a later date, the viewer is able to see the events and/or information which triggered the recording process.

More specifically, the processor CPU 260 commands the RAM memory buffer 276 to transmit the stored information to the permanent storage memory, e.g., the hard drive 278, upon the triggering of a particular event. Such an event may include, but is not limited to, the activation of a siren on the police car 100, the removal of a gun from its gun rack, sudden acceleration of the vehicle, etc. All of the information which was recorded during the specified time and saved to the RAM memory buffer 276 is then digitally saved to the permanent storage memory, e.g., one of the two onboard hard disk drives 278. Thus, the surveillance system records an event, as well as a specified time before the event. This time period of information may be valuable for determining the events that transpired before the triggering event, e.g., removal of gun, acceleration of vehicle.

If the surveillance system is commanded to continuously record onto the permanent storage memory, a triggering event is not required for the CPU 260 to command the RAM buffer memory 276 to transmit captured information to the permanent memory storage. In other words, the RAM buffer memory 276 would continuously transmit information to the permanent memory storage.

The present invention is not limited to the use of hard disk drives. Solid state memory or other types of non-volatile, non-rotating memory devices may be substituted for the hard disk drives, e.g., flash, etc.

Moreover, the present invention is not limited to a RAM memory buffer. The invention may utilize any type of memory buffer, or may be a flash memory, etc.

A transmission unit 280 may house the serial port 247 connected to the wireless modem/cellular/satellite/microwave transmitting/receiving device 283, allowing live transmission of video/audio information packets back to the home base (or precinct) 210 via a home base information receiver/transmitter 213 or networked computers. An operator located in the home base 210 is able to control which information is transmitted from the mobile server 200 back to the home base 210. For instance, the operator may view location, and/or listen to audio, and/or access other data which is transpiring at the vehicle location. As broadband technology improves, increased amounts of data will be capable of being transmitted in this manner.

The operator may command the cameras 110–140 via the remote/local camera control 264, as described above, to improve the composure, framing, and quality of the recorded data. The control 264 can be commanded from the mobile server 200, or from a home base server 211 of the home base 210 via the home base information receiver/transmitter 213 and wireless device transmitter/receiver 283. Moreover, the audio or other aspects of the data capture may be controlled from the home base location using the wireless transmission and receiving components. With this aspect of the invention, it is possible to set up a remote surveillance system wherein personnel are not required at the remote location to operate the equipment.

When the vehicle 100 returns to the home base 210, it is connected via a high-speed, high-capacity Ethernet controller 285 (such as a 3COM 1 GB controller) to the home base server 211 via port 290 and the digitally stored video/audio/related information (i.e., data stream) is data dumped to a home base master storage repository 212. The data can be dumped through copper wire, wireless transmission, fiber optics, laser or other means. FIG. 1 illustrates an example wherein a data dump outlet 160 is provided on the police car 100 for connecting the port 290 to the home base information storage 212. Once the data is loaded onto the main home base data servers 211, it is instantly and readily available for review by authorized personnel (e.g., attorneys, public interest groups, agencies or other parties which may value the recorded information), and for transmission to courtrooms or other desired locations. In addition, the data can be viewed from a web browser or proprietary software. All recorded information data can be encrypted if desired.

In addition, an Ethernet controller 285 (e.g., 10/100 type) may be connected to a port 290 for transmitting information to the laptop 243. With this configuration, the police officer, or another person who reaches the scene after an event has transpired, is able to view previously recorded information while in the vehicle 100.

Due to the searchable identification code, i.e., tags, large amounts of information can be easily searched and viewed without requiring viewing irrelevant portions of the data. Moreover, a monitor or liquid crystal display (LCD) (typically provided on the laptop 243 and/or some other display device and/or at the home base) displays all of the recorded information at one time. Thus, for instance, the operator can view video, listen to audio, view time, date, location, and event-related data (e.g., removal of a gun from a weapon rack) simultaneously.

A particular event, such as activation of the light bar on the police vehicle, can initiate the capture and processing of information in the present invention. Alternatively, information can be continuously captured and processed throughout an officer's shift, over a predetermined amount of time, etc., as controlled by the CPU 260.

One embodiment of the invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Figure 2:
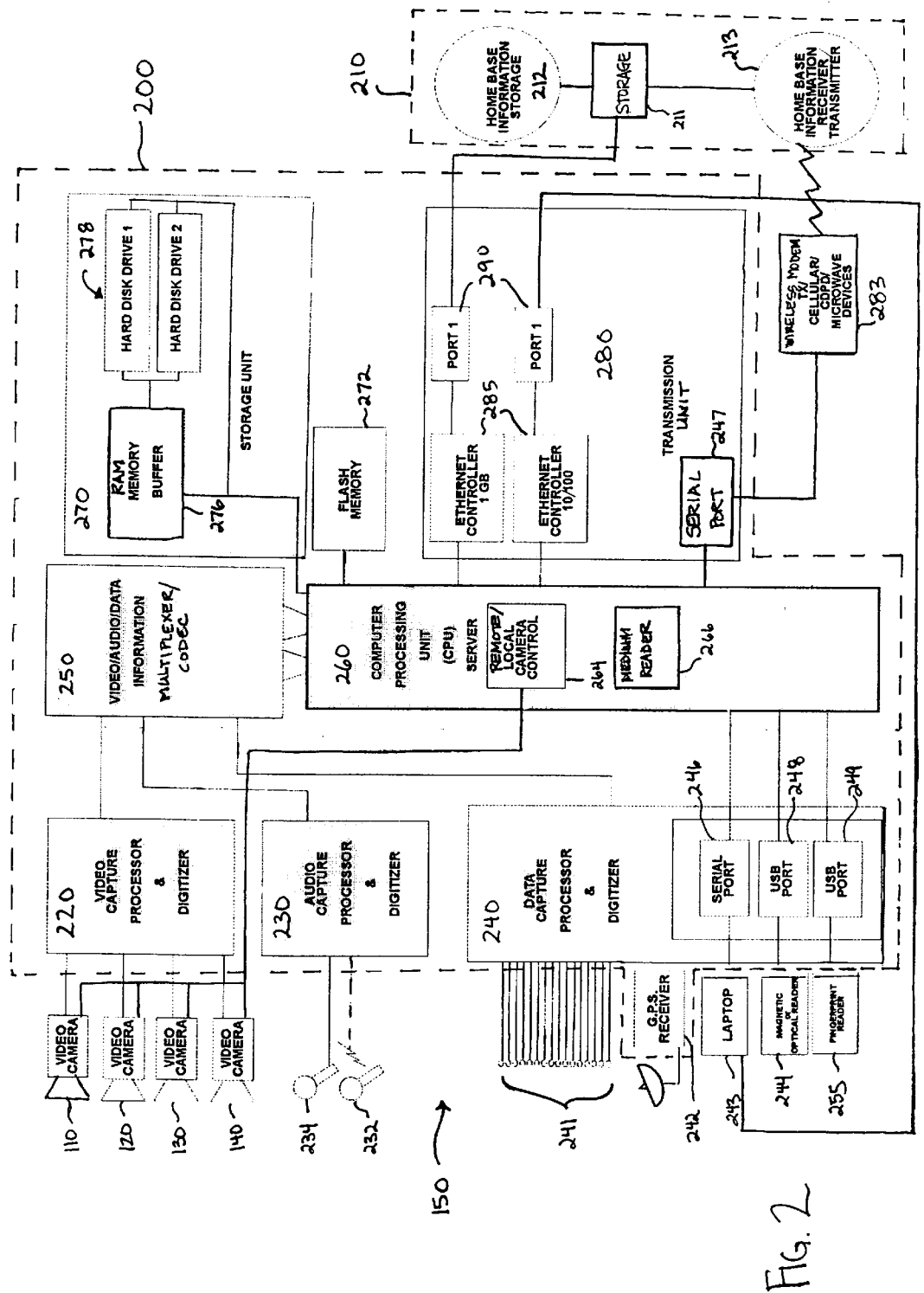
FIG. 2 illustrates a schematic diagram of the present invention.

The computer system, such as the one in the above preferred embodiment, could include the CPU 260 and the flash memory 272 which are shown in FIG. 2.

The above-identified invention may be embodied in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention. Thus, the invention is also embodied in a program product bearing software which enables a computer to perform management of information according to the invention.

The computer readable medium could be read by the CPU 260 through a medium reader 266 as illustrated in FIG. 2, for example.

The problems of current surveillance systems are eliminated with the present invention because the digital operation and storage is self contained. Also, the system of the present invention is easier to operate and maintain, reduces the risk of data loss, and overcomes data retrieval problems with current surveillance systems.

Digital storage capacity is virtually limitless. In current video systems, when used for evidentiary purposes, videotapes must be stored at appropriate temperatures and climates for up to 18 months. Though there are temperature requirements for digital storage, the range of acceptability is much wider than for videotape storage. Besides the required storage space for videotape, other physical storage issues include proper labeling, inventory control, potential for tampering (destruction, theft editing, or deleting), loss retrieval, and additional human handling errors. With the present invention, these problems are minimized because the data is stored on computer hard drives and/or computer tapes (e.g., back-up tapes) located in the home base data archiving facility along with other important data and computer equipment. These computer equipment rooms tend to be more secure than the typical videotape storage facility.

Also, when the recorded material is transferred from the mobile unit to a storage hard drive at the home base, there is no degradation of the material because there is no loss of image with a digital transfer.

With current systems, at the end of a shift the officer is required to remove all videotapes and turn them into a storage facility. However, with the present invention, the digitally stored material is data dumped via various download devices including wireless transfer, without human contact.

Data retrieval is much easier with the present invention than current systems, and during such retrieval loss of evidence is reduced. In videotape recording systems, it is necessary to conduct time consuming searches for the location of critical evidentiary scene evidence on the videotape. There is also the possibility of degradation of the tape during handling since it can stretch, break or crease. The tape may require handling by several different people to share scenes with other law enforcement officials, district attorneys, defense attorneys, judges, juries, and others.

In contrast, the digital video/audio/data information recorded by the present invention is time coded and can be easily searched without damage to data. The data can be transmitted to others for viewing via the Internet, in digital form on compact disks (CD) and digital video disks (DVD), on videotape, over low power video transmission, and through a variety of other formats without damaging or corrupting the original material.

The system of the present invention will alert the maintenance personnel in case of a system failure or error. A remote technician using a modem can solve most problems immediately. The system is compact and requires no physical contact from the officer to function properly.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A surveillance system for an emergency response vehicle, comprising:

a device for capturing at least two of video, audio, and data information, said device provided in the emergency response vehicle, and a server for digitally integrating the captured information into one data stream and storing the data stream in the emergency response vehicle, wherein said server is operative to transfer the data stream from the emergency response vehicle to a second location.

2. The surveillance system according to claim 1, wherein said server comprises:

a storage unit for storing the data stream;

a transmission unit for transmitting the data stream to the second location;

a computer processing unit for controlling said storage unit, and said transmission unit.

3. The surveillance system according to claim 2, wherein said server further comprises a video/audio/data information multiplexer for integrating the captured information into the data stream.

4. The surveillance system according to claim 3, wherein said capturing device includes a digital video capturing device for capturing video information, an audio capturing device for capturing audio information, and a data capturing device for capturing data information, and said video/audio/data multiplexer integrates the video, audio and data information into the data stream.

5. The surveillance system according to claim 2, wherein said capturing device continuously captures data, said storage unit includes a memory buffer for temporarily storing the continuously captured information and a permanent memory for permanently storing the captured information until said transmission unit transmits the captured information to the second location.

6. The surveillance system according to claim 5, wherein said computer processing unit commands said memory buffer to transfer the stored information to said permanent memory upon the presence of a triggering event, so that a portion of the stored information, which was captured before the occurrence of the triggering event, is transferred to said permanent memory.

7. The surveillance system according to claim 5, further comprising:
   a wireless device for transmitting at least some of the captured information from the server to the second location when said server is remotely located from the second location; and
   an Ethernet controller for transmitting the data stream to the second location when the server is located at the second location,
   wherein said wireless device is adapted to receive information from the second location.

8. The surveillance system according to claim 7, wherein said computer processing unit includes a camera control device, for controlling at least one camera that supplies video information for the video capturing device, said camera control device being controlled by one of said computer processing unit and a computer processing unit of the second location via said wireless device.

9. The surveillance system according to claim 1, wherein said capturing device is a data capture processor and digitizer for receiving at least one of a plurality of data inputs and other event information which is then integrated, stored and transmitted by said server.

10. The surveillance system according to claim 1, provided in a police vehicle.

11. The surveillance system according to claim 3, wherein the multiplexer compresses the captured information.

12. The surveillance system according to claim 6, wherein said triggering event includes at least one of activation of a siren, removal of a gun from a gun rack, sudden acceleration of the vehicle.

13. The surveillance system according to claim 1, wherein each of said video, audio and data information is captured, integrated and stored in said server.

14. A surveillance system for an emergency response vehicle, comprising:
   means for capturing at least two of video, audio, and data information;
   means for storing the information in the emergency response vehicle;
   means for digitally integrating the information into one data stream; and
   means for transmitting the one data stream from the emergency response vehicle to a remote location.

15. A surveillance system for an emergency response vehicle, comprising
   means for capturing at least two of video, audio, and data information;
   means for storing the information in the emergency response vehicle;
   means for integrating the information into one data stream;
   means for transmitting the one data stream from the emergency response vehicle to a remote location;
   a digital video camera; and
   means for controlling said digital video camera from the remote location.

16. The surveillance system according to claim 15, further comprising means for automatically controlling said digital video camera to track movements of an object.

17. A process for managing information obtained from a vehicle, the information including at least two of video, audio, and data information, comprising:
   capturing the information;
   digitally integrating the information into one data stream; and
   storing the data stream in the vehicle.

18. The process for managing information according to claim 17, further comprising:
   transmitting the data stream to a storage device in a remote location.

19. A process for managing information obtained from a vehicle, the information including at least two of video, audio, and data information, comprising:
   capturing the information;
   integrating the information into one data stream;
   storing the data stream in the vehicle;
   embedding searchable identification codes in the data stream during the integrating of the information; and
   transmitting at least a portion of the data stream via a wireless device to a receiving device in the remote location.

20. A computer system adapted to manage information from a vehicle, the information including at least two of video, audio, and data information, comprising:
   a processor, and
   a memory including software instructions adapted to enable a computer to perform the steps of:
   capturing the information;
   digitally integrating the information into one data stream; and
   storing the data stream in the vehicle.

21. The computer system according to claim 20, wherein the software instructions are adapted to enable the computer to perform the additional step of: compressing the information captured in the capturing step.

22. A computer program product for enabling a computer to manage information from a vehicle, the information including at least two of video, audio, and data information, comprising:
   software instructions for enabling the computer to perform predetermined operations, and
   a computer readable medium bearing the software instructions;
   the predetermined operations including the steps of:
   capturing the information;
   digitally integrating the information into one data stream; and
   storing the information in the vehicle.

23. The computer system according to claim 20, wherein the step of capturing the information is performed by at least one of a digital video capturing device, an audio capturing device and a data capturing device, and the step of integrating the information is performed by a video/audio/data multiplexer.

24. The computer program product according to claim 22, wherein the step of capturing the information is performed by at least one of a digital video capturing device, an audio capturing device and a data capturing device, and the step of integrating the information is performed by a video/audio/data information multiplexer.

25. The computer program product according to claim 22, wherein the predetermined operations further includes the step of: compressing the information captured in the capturing step.

\* \* \* \* \*